July 5, 1932.  H. HERTFELDER  1,866,303

WOOD RIM PULLEY

Filed July 26, 1930

INVENTOR
H. Hertfelder
BY E.J. Fetherstonhaugh
ATTORNEY

Patented July 5, 1932　　　　　　　　　　　　　　1,866,303

UNITED STATES PATENT OFFICE

HENRY HERTFELDER, OF TORONTO, ONTARIO, CANADA, ASSIGNOR TO DODGE MANUFACTURING COMPANY LIMITED, OF TORONTO, ONTARIO, CANADA

WOOD RIM PULLEY

Application filed July 26, 1930, Serial No. 470,874, and in Canada January 13, 1930.

The invention relates to improvements in wood rim pulleys, as described in the present specification and illustrated in the accompanying drawing that forms part of same.

The invention consists essentially of the novel features of construction pointed out broadly and specifically in the claims for novelty following a description containing an explanation in detail of an acceptable form of the invention.

The objects of the invention are to utilize the strength of laminated wood veneers in the construction of wood rim pulleys and to eliminate the use of castings; to construct a pulley for transmission purposes light in weight and capable of high speeds without bursting; to facilitate the construction of the component parts of wood pulleys and to produce a pulley free from the internal and machining stresses to which the usual cast-iron pulley is subject to; and to generally provide a transmission pulley light in weight, economical as to its cost and production and having long wearing properties and great strength.

In the drawing, Figure 1 is a perspective view of a form of the invention made entirely of wood.

Like numerals of reference indicate corresponding parts in the various figures.

The numeral 10 indicates the rim of a pulley, said rim being split diametrically at 11 and forming the two halves 12 and 13. The rim is formed of a number of layers of veneer 14 and 15, the layers being securely glued to each other under pressure.

Figure 1:
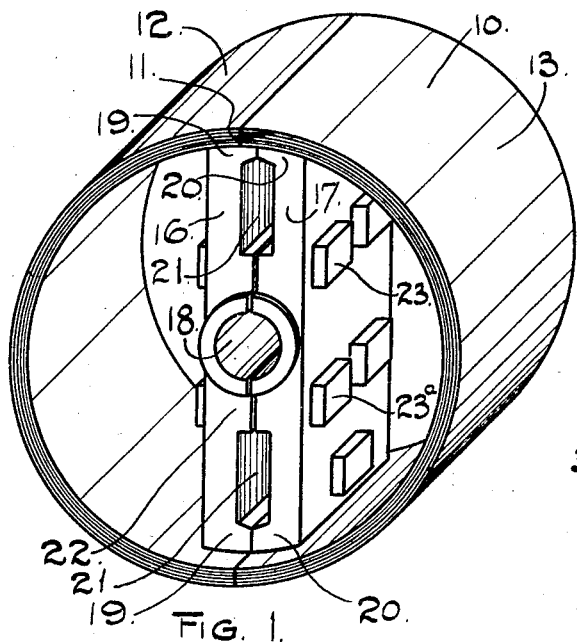

The form of the invention illustrated in Figure 1 shows a pulley having the arms 16 and 17 made of wood. These arms are bored centrally at 18 for the transmission shaft, and are provided with the pads 19 and 20 abutting on the center line close to the rim while the central portion of the arms are recessed at 21.

The arms are thickened up around the shaft orifice 18 to form a hub 22; sufficient clearance being allowed between the faces of the arms to allow the bolts 23 and 23a to firmly grip the hub 22 around the shaft.

Figure 2:
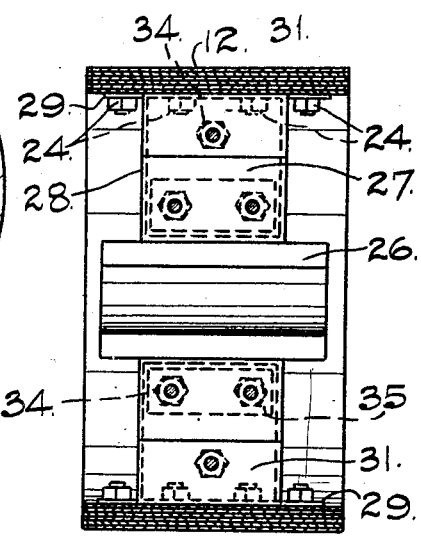
Figure 2 is an elevational view showing half of a pulley with pressed steel arms.
Figure 3:
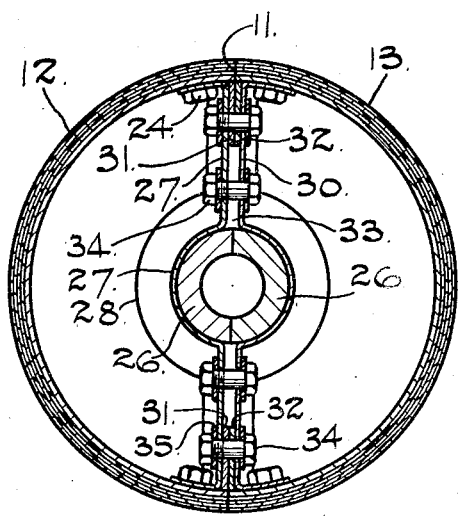
Figure 3 is a sectional elevation of the form of the invention illustrated in Figure 2.

The form of the invention illustrated in Figure 2 consists of a rim made in the same manner as hereinbefore described but has the bolts 24 with the enlarged heads 25 imbedded therein well below the surface of the rim.

The central bush 26 is in two pieces and each half is encircled by the pressed steel arm 27 having the outwardly extending flange 28 on either side, the ends 29 being flanged over to conform with the inner contour of the rim and form the means of securing the half arm to the rim. The arm 30 is formed in a like manner and encircles the other half of the central bush and is secured to the other half of the rim in the same way. The outer ends of the arms are provided with the pads 31 and 32 which abut on the center line leaving a clearance space 33 between the arms.

The securing bolts 34 project through both arms and the plates 35 which thicken the material around the holes.

It will be seen by this form of construction the pulley is made very light but very strong.

On forming the rims the natural tendency of the material is to close together so that when the arms are assembled the actual stress in the rims is towards the center of the shaft so that very high speeds can be made with a thin rim without any fear of the rim bursting which is the common fault of cast-iron rims and arms.

Figure 4:
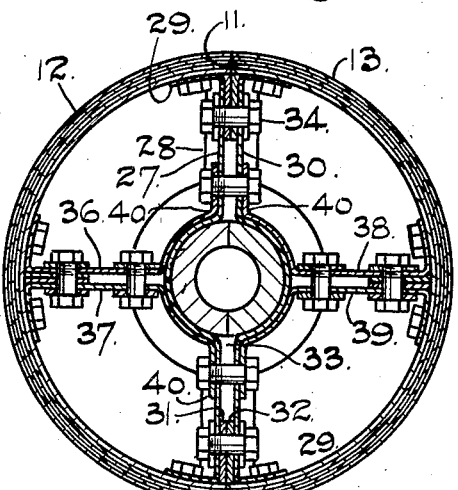
Figure 4 is a sectional elevation of a form of the invention having four arms.
Figure 5:
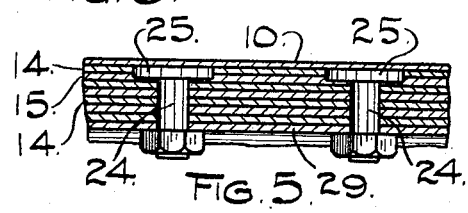
Figure 5 is an enlarged fragmentary sectional detail of the rim showing the attachment of the arms thereto.

In Figure 4 a modified form of the invention is illustrated for heavy duty use.

The rim and arms are formed in a similar manner as hereinbefore disclosed with the exception that the arms 36, 37, 38 and 39 are added.

It will be seen that these arms are so formed so that the hub portion of the pulley has a double thickness of material, the ends of the arms encircling the hub and having the upwardly extending flanges 40 with holes in alignment with the holes in the arms 27 and 28 for the securing bolts 34. Each arm is flanged in a like manner so that on tightening the bolts 34 all four arms grip around the central bush, the arms being secured to the rim in the same manner as hereinbefore described by bolts imbedded in the rim.

This construction is very light and it is obvious that standard component parts may be utilized to build a pulley for any particular use.

What I claim is:—

1. In a wood rim pulley, a rim split diametrically and formed of alternate layers of wood veneer, bolts imbedded below the surface of said rim adjacent and either side of said split, pressed metal arms adapted to form a central hub an upstanding flange around the edges of said arms, and a central bush split diametrically within said hub adapted to encircle a shaft and grip thereon, auxiliary arms secured to said rim and adapted to encircle said hub and be secured to the fastenings of the first said arms.

2. In a wood rim pulley, a rim split diametrically and formed of alternate layers of wood veneer, bolts imbedded in said rim below the surface adjacent and either side of said split, bolts intermediate of the first named bolts imbedded in said rim, a pair of arms at either side of said split adapted to form a hub and encircling a central wooden bush within said hub, auxiliary arms secured to said intermediately disposed bolts and flanges at their extremities to encircle said hub and be secured under the fastenings of said first named arms, means for securing said auxiliary arms together and means for tightening said auxiliary arms around said hub coacting with said first named arms to secure said pulley to a shaft.

Signed at Toronto, Canada, this 25th day of June 1930.

HENRY HERTFELDER.